(12) United States Patent
Prestenback

(10) Patent No.: US 9,383,730 B2
(45) Date of Patent: Jul. 5, 2016

(54) ZONE BASED IDENTIFICATION FOR INTERACTIVE EXPERIENCES

(71) Applicant: Disney Enterprises, Inc., Burbank, CA (US)

(72) Inventor: Kyle J. Prestenback, Burbak, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 213 days.

(21) Appl. No.: 13/953,472

(22) Filed: Jul. 29, 2013

(65) Prior Publication Data

US 2015/0028994 A1 Jan. 29, 2015

(51) Int. Cl.
| G05B 19/00 | (2006.01) |
| H04Q 5/22 | (2006.01) |
| G06Q 30/00 | (2012.01) |
| G05B 1/01 | (2006.01) |

(52) U.S. Cl.
CPC ........................................ *G05B 1/01* (2013.01)

(58) Field of Classification Search
CPC ........................................................ G05B 1/01
USPC .......................................................... 340/5.6
See application file for complete search history.

(56) References Cited

U.S. PATENT DOCUMENTS

| 6,691,032 B1 | 2/2004 | Irish et al. ...................... 701/213 |
| 8,012,023 B2 | 9/2011 | Gates, III et al. ................ 463/40 |
| 8,102,334 B2 | 1/2012 | Brown et al. ...................... 345/8 |
| 8,112,295 B1 | 2/2012 | Parker et al. ...................... 705/5 |
| 8,244,468 B2 | 8/2012 | Scalisi et al. .................. 701/519 |
| 8,275,867 B2 | 9/2012 | Neerdaels ..................... 709/223 |
| 2010/0228602 A1 * | 9/2010 | Gilvar ................ G07C 9/00111 705/14.5 |
| 2011/0221771 A1 | 9/2011 | Cramer et al. ................ 345/633 |
| 2011/0225069 A1 | 9/2011 | Cramer et al. ............... 705/27.1 |
| 2011/0265116 A1 | 10/2011 | Stern et al. ........................ 725/35 |
| 2012/0025976 A1 | 2/2012 | Richey et al. .................. 340/539 |
| 2012/0246223 A1 | 9/2012 | Newhouse et al. ........... 709/203 |
| 2012/0256917 A1 | 10/2012 | Lieberman et al. ........... 345/419 |

FOREIGN PATENT DOCUMENTS

WO WO 2012/124939 9/2012

OTHER PUBLICATIONS

Ajanki et al., "An Augmented Reality Interface to Contextual Information" Virtual Reality vol. 15, Issue 2-3, Jun. 2011, pp. 161-173.

* cited by examiner

*Primary Examiner* — Jennifer Mehmood
*Assistant Examiner* — John Mortell
(74) *Attorney, Agent, or Firm* — Sheppard Mullin Richter & Hampton LLP

(57) ABSTRACT

This disclosure relates to a system configured to trigger interactive experiences for guests. The system may be a zone based identification system that uses identification technology (e.g., RFID, image recognition, etc.) to detect and/or identify guests in zones prior to, during, and after an interactive experience. The zones may be physical areas where guests approach, participate in, and leave the interactive experience. The system may be configured such that as guests progress through zones prior to, during, and after the interactive experience, the system may access guest specific information before the interactive experience, present the guest specific information during the interactive experience, and then stop presenting the information responsive to the guest exiting the interactive experience. In some implementations, the system may comprise one or more objects associated with guests, one or more sensors, one or more processors, one or more host systems, and/or other components.

24 Claims, 10 Drawing Sheets ion system.

ZONE BASED IDENTIFICATION FOR INTERACTIVE EXPERIENCES

FIELD OF THE DISCLOSURE

This disclosure relates to a system and method for triggering interactive experiences for guests with a zone based identification system.

BACKGROUND

Identifying geographical locations of users is known. For example, radio frequency identification devices (RFID) or image recognition technology may be used to detect a user in a given location. Storing information about users in a database is known. Recalling stored information about users responsive to identifying the geographical location of the user is typically not used in contexts where users may mill about in a room such as in a theme park ride exit, areas where people are waiting for a dining table, or other areas where people come and go. A device that identifies a given user may become unreadable by the identification system (e.g., RFID, image recognition technology, etc.) in the previously mentioned contexts. Blanketing a location of interest with identification hardware may quickly compromise the ride and/or dining experience as the space fills with identification technology.

SUMMARY

One aspect of the disclosure relates to a system configured to trigger interactive experiences for guests. The system may be a zone based identification system that uses identification technology (e.g., RFID, image recognition, etc.) to detect and/or identify guests in zones prior to, during, and after an interactive experience. In some implementations, guests may be detected and/or identified by objects (e.g., wristbands that incorporate RFID technology) associated with the guests. The zones may be physical areas where guests approach, participate in, and leave the interactive experience. The system may be configured such that as guests progress through zones prior to, during, and after the interactive experience, the system may access guest specific information before the interactive experience, present the guest specific information during the interactive experience, and then stop presenting the information responsive to the guest exiting the interactive experience. In some implementations, the system may comprise one or more objects associated with guests, one or more sensors, one or more processors, one or more host systems, and/or other components.

The objects may be associated with guests. The objects may be configured to be detected by the sensors responsive to the objects being in proximity to the sensors. In some implementations, the objects may include one or more components that may be detected by the sensors. For example, the objects may include radio frequency identification (RFID) tags, components related to Wi-Fi technology, components related to GPS technology, and/or other components. The form factor of the objects associated with individual guests may include a wearable accessory such as a bracelet, a wristband, a necklace, and/or other form factors. The form factor of the objects may include a device configured to be carried, such as a card, a toy, a disc, a puck, and/or other devices. In some implementations, the objects may include devices distributed by a theme park upon guests entering a theme park, and/or other electronic devices.

The one or more sensors may be configured to generate output signals that convey information related to presence of the objects. The sensors may be disposed in a plurality of sensing locations in and/or around an interactive experience. The sensing locations may include locations in tables, the ceiling, doorways, walls, floor, furniture, outdoor features (e.g., lamp posts, cones, railings, etc.), outdoor landscaping, and/or other locations. In some implementations, the output signals of the sensors may be configured to convey information related to the relative physical positions of the sensors in and/or around an interactive experience. For example, the sensors may include sensors associated with a preparation zone, sensors associated with a trigger zone, sensors associated with an experience zone, sensors associated with an exit zone, and/or other sensors.

The one or more processors may be configured to provide information processing capabilities in the system. The one or more processors may be configured to execute one or more computer program modules. The one or more computer program modules may comprise one or more of a guest module, a preparation zone detection module, a caching module, a group preparation module, a trigger zone detection module, an interactive experience module, an exit module, and/or other modules.

The guest module may be configured to manage guest profiles associated with the guests. The guest profiles may include guest information associated with the guests. In some implementations, the guest information may be obtained via the host systems. The guest information may include personal information, information identifying the guests, pictures of the guests, relationship information relative to other guests, behavior information, preferences, interests, personality information, demographic information associated with the guests, interaction history among guests, metadata associated with the guests, mobile devices associated with guests, data generated during prior interactive experiences experienced by the guests, and/or other information. For example, the guest profiles may include a first guest profile that includes guest information associated with a first guest. The first guest profile may indicate that the first guest is part of a first traveling party unit. The first guest profile may indicate that the first guest is part of a first guest group. The guest group may be a subset of the traveling party unit. Other guest profiles managed by the guest module may indicate that a second guest is part of the first traveling party unit and/or guest group, and/or that a third and fourth guest are part of a second traveling party unit and/or second guest group.

The preparation zone detection module may be configured to detect presence of the objects in the preparation zone based on the output signals from the sensors. For example, the preparation zone detection module may be configured to detect presence of a first object and a second object associated with the first and second users from the first guest group in the preparation zone. The preparation zone detection module may be configured to detect presence of a third object and a fourth object associated with the third and fourth users from the second guest group in the preparation zone.

The preparation zone may comprise a first physical area located upstream from the experience zone. The interactive experiences may be presented to the guests in the experience zone.

The caching module may be configured to cache guest information in the guest profiles responsive to the detections by the preparation zone detection module. The caching module may cache the information in guest profiles associated with guests whose corresponding objects have been detected in the preparation zone. Caching the guest information may allow the guest information to be readily available for presentation during an interactive experience.

The group preparation module may be configured to indicate that the guest groups are prepared for interactive experiences. For example, the group preparation module may be configured to indicate that the first guest group is prepared for a first interactive experience and the second guest group is prepared for a second interactive experience. The indications that the guest groups are prepared may be responsive to a threshold number of objects associated with guests of an individual guest group and/or travelling party being detected in the preparation zone. In some implementations, the group preparation module may be configured to indicate that the guest groups are prepared for interactive experiences based at least in part on guest information in the guest profiles.

The trigger zone detection module may be configured to detect presence of the objects in the trigger zone based on the output signals. The trigger zone may comprise a second physical area that is downstream from the preparation zone. In some implementations, the trigger zone and the experience zone may be the same physical area.

The interactive experience module may be configured to trigger the interactive experiences for the guests in the experience zone. The interactive experience module may be configured such that responsive to the detection of presence of the objects (e.g., the first object) in the preparation zone and then the trigger zone, an interactive experience for the associated guest(s) may be triggered in the experience zone. In some implementations, the interactive experience module may be configured such that responsive to detection of presence of the objects from a given guest group in the preparation zone, and then at least one of the objects from the given guest group in the trigger zone, the interactive experience for the given guest group is triggered in the experience zone. In some implementations, the interactive experience module may be configured such that, responsive to detection of presence of two or more guest groups in the preparation zone, and then at least one object from each guest group in the trigger zone, interactive experience module may be configured to determine an interactive experience priority between the interactive experiences for each group, and to trigger the interactive experiences based on the determined priority.

The exit module may be configured to determine that the objects have exited the experience zone and to cause the interactive experience triggered for the corresponding guests to cease responsive to the exit determination. In some implementations, the exit module may be configured to determine that the objects have exited the experience zone based on the output signals from the sensors. In some implementations, the exit module may be configured to determine that the objects have exited the experience zone based on an expiration of a predetermined amount of time since the trigger zone detection module first detected presence of the objects in the trigger zone.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
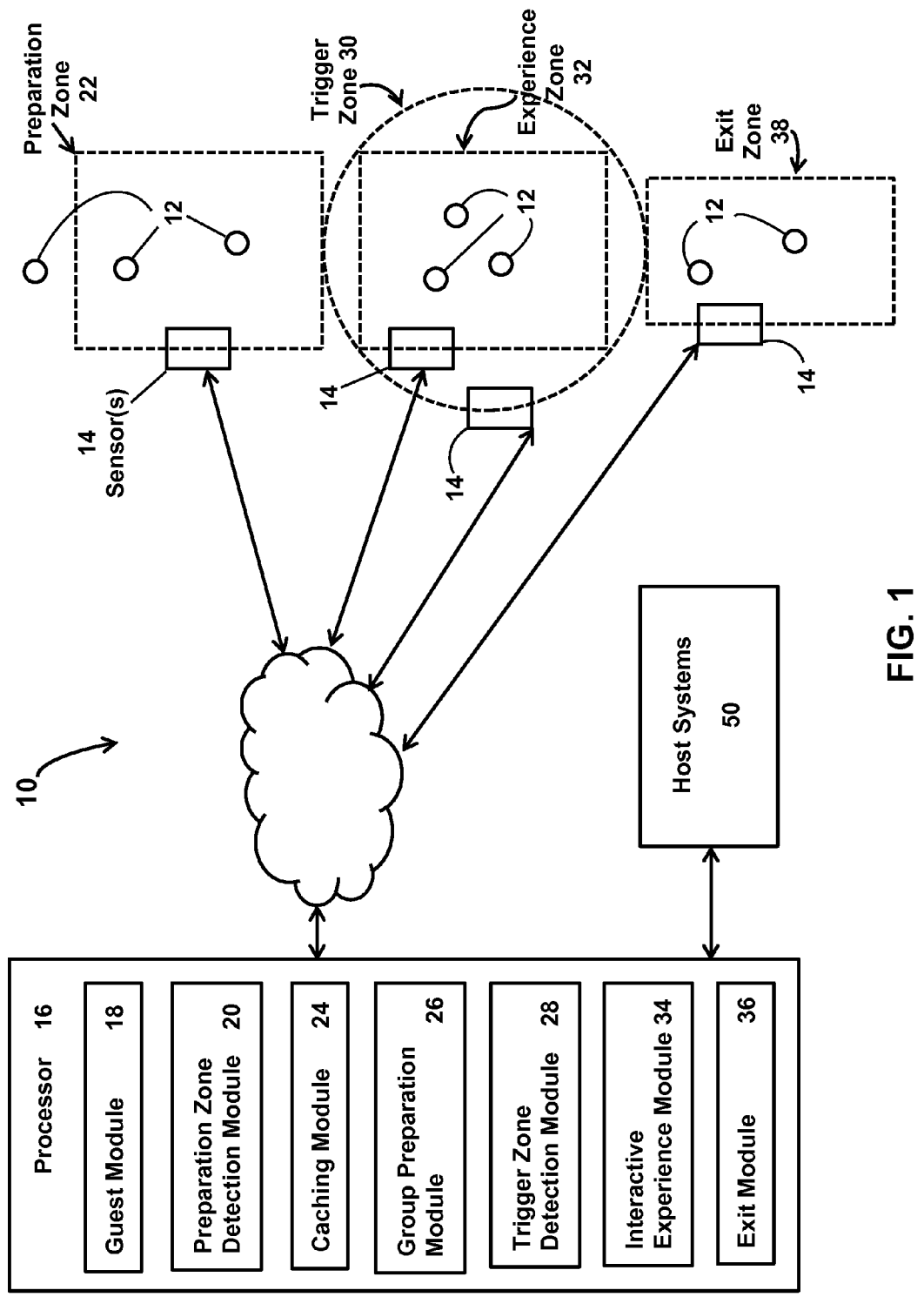
FIG. 1 illustrates a system configured to trigger interactive experiences for guests.

FIG. 1 illustrates a system 10 system configured to trigger interactive experiences for guests. System 10 may be a zone based identification system that uses identification technology (e.g., RFID, image recognition, etc.) to detect and/or identify guests in zones prior to, during, and after an interactive experience. In some implementations, guests may be detected and/or identified by objects (e.g., wristbands that incorporate RFID technology) associated with the guests. The zones may be physical areas where guests approach, participate in, and leave the interactive experience. The zones may be defined to meet the needs of the physical location surrounding and/or including the interactive experience. For example, a zone may be defined by a portal (e.g., a doorway) and/or other physical feature that channels guests from one zone to the next. System 10 may be configured such that as guests progress through zones prior to, during, and after the interactive experience, system 10 may access guest specific information before the interactive experience, present the guest specific information during the interactive experience, and then stop presenting the information responsive to the guest exiting the interactive experience. In some implementations, system 10 may be deployed in an area where a guest flow pattern is known. For example, a guest flow pattern may be known in a theme park ride queue and/or other queues, in and/or around a restaurant entrance, in and/or around a hotel lobby, and/or in other areas. In some implementations, system 10 may comprise one or more objects 12 associated with guests, one or more sensors 14, one or more processors 16, one or more host systems 50, and/or other components.

The components of system 10 may be operatively linked via one or more electronic communication links. For example, such electronic communication links may be established, at least in part, via a wireless network such as the Internet and/or other networks. In some implementations, the components of system 10 may be configured to communicate directly with each other. It will be appreciated that this is not intended to be limiting, and that the scope of this disclosure includes implementations in which objects 12, sensors 14, processors 16, host systems 50, and/or other components may be operatively linked via some other communication media, or with linkages not shown in FIG. 1.

Objects 12 may be associated with guests. Objects 12 may be configured to be detected by sensors 14 responsive to objects 12 being in proximity to sensors 14. In some implementations, objects 12 may include one or more components that may be detected by sensors 14. For example, objects 12 may include radio frequency identification (RFID) tags, components related to Wi-Fi technology, components related to GPS technology, and/or other components.

In some implementations, objects 12 may include individual guest identification devices associated with individual guests. The form factor of objects 12 associated with individual guests may include a wearable accessory such as a bracelet, a wristband, a necklace, and/or other form factors. The form factor of objects 12 may include a device configured to be carried, such as a card, a toy, a disc, a puck, and/or other devices. In some implementations, the components of objects 12 listed above and/or other components may be formed in a surface of objects 12. In some implementations, objects 12 may include the personal mobile devices of the guests, devices distributed by a theme park upon guests entering a theme park, and/or other electronic devices.

One or more sensors 14 may be configured to generate output signals that convey information related to presence of objects 12. Sensors 14 may be disposed in a plurality of sensing locations in and/or around an interactive experience. The sensing locations may include locations in tables, the ceiling, doorways, walls, floor, furniture, outdoor features (e.g., lamp posts, cones, railings, etc.), outdoor landscaping, and/or other locations.

In some implementations, the output signals of sensors 14 may be configured to convey information related to the relative physical positions of the sensors in and/or around an interactive experience. For example, sensors 14 may include sensors associated with a preparation zone 22, sensors associated with a trigger zone 30, sensors associated with an experience zone 32, sensors associated with an exit zone 38, and/or other sensors. Output signals from the sensors associated with preparation zone 22 may include information related to a relative physical position of the preparation zone. The output signals from the sensors associated with the trigger zone may include information related to a relative physical position of the trigger zone. The output signals from the sensors associated with the experience zone may include information related to a relative physical position of the experience zone. The output signals from the sensors associated with the exit zone may include information related to a relative physical position of the exit zone.

In some implementations, sensors 14 may be configured to send outbound signals to objects 12, and/or receive inbound signals from objects 12. In some implementations, the inbound signals received by sensors 14 from objects 12 may include signal strengths related to distances between sensors 14 objects 12. The signal strengths may be stronger when objects 12 are closer to sensors 14. The signal strengths may be weaker when objects 12 are farther from sensors 14. For example, sensors 14 associated with preparation zone 22 may have a stronger signal relative to sensors 14 associated with trigger zone 30 responsive to a given object 12 being in preparation zone 22 closer to sensors 14 associated with preparation zone 22 than sensors 14 associated with trigger zone 30.

Processor 16 may be configured to provide information processing capabilities in system 10. As such, processor 16 may comprise one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may comprise a plurality of processing units. These processing units may be physically located within the same device (e.g., a system server), or processor 16 may represent processing functionality of a plurality of devices operating in coordination.

In some implementations, processor 16 may be implemented in one or more system servers. The system servers may include electronic storage, one or more processors including processor 16, and/or other components. The servers may include communication lines, or ports to enable the exchange of information with a network and/or other computing platforms. The servers may include a plurality of hardware, software, and/or firmware components operating together to provide the functionality attributed herein to processor 16. For example, the servers may be implemented by a cloud of computing platforms operating together as a system server.

Processor 16 may be configured to execute one or more computer program modules. The one or more computer program modules may comprise one or more of a guest module 18, a preparation zone detection module 20, a caching module 24, a group preparation module 26, a trigger zone detection module 28, an interactive experience module 34, an exit module 36, and/or other modules. Processor 16 may be configured to execute modules 18, 20, 24, 26, 28, 34, and/or 36 by software; hardware; firmware; some combination of software, hardware, and/or firmware; and/or other mechanisms for configuring processing capabilities on processor 16.

It should be appreciated that although modules 18, 20, 24, 26, 28, 34, and 36 are illustrated in FIG. 1 as being co-located within a single processing unit, in implementations in which processor 16 comprises multiple processing units, one or more of modules 18, 20, 24, 26, 28, 34, and/or 36 may be located remotely from the other modules. The description of the functionality provided by the different modules 18, 20, 24, 26, 28, 34, and/or 36 described below is for illustrative purposes, and is not intended to be limiting, as any of modules 18, 20, 24, 26, 28, 34, and/or 36 may provide more or less functionality than is described. For example, one or more of modules 18, 20, 24, 26, 28, 34, and/or 36 may be eliminated, and some or all of its functionality may be provided by other modules 18, 20, 24, 26, 28, 34, and/or 36. As another example, processor 16 may be configured to execute one or more additional modules that may perform some or all of the functionality attributed below to one of modules 18, 20, 24, 26, 28, 34, and/or 36.

Guest module 18 may be configured to manage guest profiles associated with the guests. The guest profiles may include guest information associated with the guests. In some implementations, the guest information may be obtained via host systems 50. The guest information may include personal information, information identifying the guests, pictures of the guests, relationship information relative to other guests, behavior information, preferences, interests, personality information, demographic information associated with the guests, interaction history among guests, metadata associated with the guests, mobile devices associated with guests, data generated during prior interactive experiences experienced by the guests, and/or other information. For example, the guest profiles may include a first guest profile that includes guest information associated with a first guest. The first guest profile may indicate that the first guest is part of a first traveling party unit. The first guest profile may indicate that the first guest is part of a first guest group. The guest group may be a subset of the traveling party unit. Other guest profiles managed by guest module 18 may indicate that a second guest is part of the first traveling party unit and/or guest group, and/or that a third and fourth guest are part of a second traveling party unit and/or second guest group. The description of guest module 18 provided herein is not intended to be limiting. Guest module 18 may be configured to manage guest profiles from any number of guests who form any number of traveling party units and/or guest groups.

Figure 2:
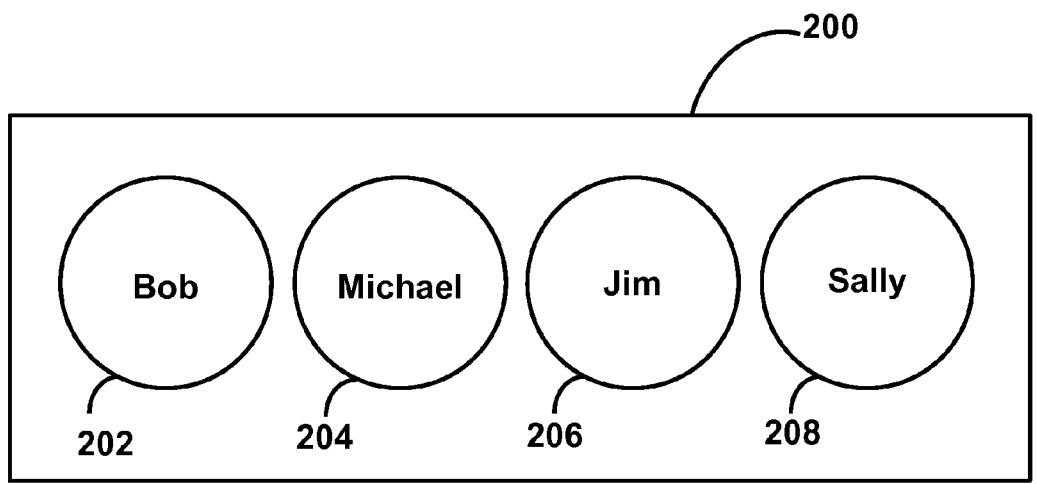
FIG. 2 illustrates an example of a traveling party.

By way of a non-limiting example, FIG. 2 illustrates an example of a first traveling party unit 200 comprising four members. Traveling party unit 200 includes Bob, Michael, Jim, and, Sally. In FIG. 2, Bob is associated with object 202. Michael is associated with object 204. Jim is associated with object 206. Sally is associated with object 208. The members of traveling party unit 200 may be associated with each other. For example, the members of guest group 200 may be family members, friends, coworkers, and/or may be associated in other ways. In some implementations, the members of traveling party unit 200 may not always be present together. For example, Bob and Michael may be in a theme park ride queue without Jim and Sally. In this example, Bob and Michael may form a guest group.

Returning to FIG. 1, preparation zone detection module 20 may be configured to detect presence of objects 12 in preparation zone 22 based on the output signals from sensors 14. For example, preparation zone detection module 20 may be configured to detect presence of a first object and a second object associated with the first and second users from the first guest group in preparation zone 22. Preparation zone detection module 20 may be configured to detect presence of a third object and a fourth object associated with the third and fourth users from the second guest group in preparation zone 22.

Preparation zone 22 may comprise a first physical area located upstream from experience zone 32. The interactive experiences may be presented to the guests in experience zone 32. In some implementations, the interactive experiences may present audio information (e.g., music), visual information (e.g., pictures), olfactory information (e.g., smells), gustatory information (e.g., tastes), somatosensory (e.g., touch) information, and/or other information. For example, the interactive experiences may include picture effect displays, complex media displays, physical touch events (e.g., a blowing breeze) with picture effects and/or complex media displays, zone based cast facing applications, controlled and/or manually accelerated cast facing applications, vehicle association based applications, and/or other interactive experiences. In some implementations, a complex media display may be a form of picture effect that uses more detailed interactive technology. Wherein a picture effect may be 'passive', a complex media display may ask a guest to interact further. An example of complex media display may include a display screen that starts tracking guest movements. A cast facing application may include software (e.g., a user interface) that a cast member sees, like a dashboard. Vehicle association applications may be a mode of play wherein a ride vehicle is tracked through an attraction.

Caching module 24 may be configured to cache guest information in the guest profiles responsive to the detections by preparation zone detection module 20. Caching module 24 may cache the information in guest profiles associated with guests whose corresponding objects 12 have been detected in preparation zone 22. Caching the guest information may allow the guest information to be readily available for presentation during an interactive experience. Caching may include retrieving relevant information from host systems 50 and/or other locations, and preparing the information so that it is ready to present as soon as an interactive experience is triggered.

In some implementations, such as when guests revisit an interactive experience, the guest information may be re-cached by caching module 24. The re-cached information may include any updated guest information obtained by host systems 50 since the time the guests originally visited the interactive experience.

Group preparation module 26 may be configured to indicate that the guest groups are prepared for interactive experiences. For example, group preparation module 26 may be configured to indicate that the first guest group is prepared for a first interactive experience and the second guest group is prepared for a second interactive experience. The indications that the guest groups are prepared may be responsive to a threshold number of objects 12 associated with guests of an individual guest group and/or travelling party being detected in preparation zone 22. For example, if an object 12 associated with a single member of a travelling party enters preparation zone 22, group preparation module 26 may not indicate that a guest group is prepared. However, if two objects 12 associated with two members from a traveling party enter preparation zone 22, group preparation module 26 may indicate that group of two as being ready for the interactive experience. In some implementations, as described above, all members of an individual traveling party may not be present together. Group preparation module 26 may be configured to indicate which members of a traveling party are present together and whether they are prepared for the interactive experience.

In some implementations, group preparation module 26 may be configured to indicate that the guest groups are prepared for interactive experiences based at least in part on guest information in the guest profiles. In some implementations, group preparation module 26 may be configured to indicate that the group of two in the example above is ready for the interactive experience based on guest information from the guest profiles associated with the two guests. The guest information may indicate that the group of two is a guest group because the two associated corresponding objects 12 (e.g., without other objects 12 associated with the rest of the members of a larger traveling party) had been detected together at other locations throughout the theme park, for example. In some implementations, the guest information may include predetermined information indicating that the two guests would be traveling together regularly. For example, the two guests may be a father and a son who indicated they would be traveling separately from a mother and daughter while in the theme park.

Trigger zone detection module 28 may be configured to detect presence of objects 12 in trigger zone 30 based on the output signals. Trigger zone 30 may comprise a second physical area that is downstream from preparation zone 22. For example, trigger zone detection module 28 may detect presence of the first object associated with the first user in trigger zone 30. In some implementations, trigger zone 30 and experience zone 32 may be the same physical area. In some implementations, trigger zone detection module 28 may be configured to detect presence of at least one object 12 associated with a guest in a guest group. For example, trigger zone detection module 28 may be configured to detect presence of at least one of the first object or the second object in trigger zone 30. Trigger zone detection module 28 may be configured to detect presence of at least one of the third object or the fourth object in trigger zone 30.

Interactive experience module 34 may be configured to trigger the interactive experiences for the guests in experience zone 32. Interactive experience module 34 may be configured such that responsive to the detection of presence of objects 12 (e.g., the first object) in preparation zone 22 and then trigger zone 30, an interactive experience for the associated guest(s) may be triggered in experience zone 32. The interactive experience may include content related to the guest information in the guest profiles and/or the information cached by caching module 24. For example, responsive to the detection of presence of the first object in preparation zone 22 and then trigger zone 30, an interactive experience for the first guest may be triggered in experience zone 32. The interactive experience for the first guest may include content related to the guest information in the first guest profile, the information cached by caching module 24, and/or other information.

In some implementations, interactive experience module 34 may be configured such that responsive to detection of presence of objects 12 from a given guest group in preparation zone 22, and then at least one of the objects 12 from the given guest group in trigger zone 30, the interactive experience for the given guest group is triggered in experience zone 32. The interactive experience for the given guest group may include content related to the guest information in the guest profiles of the guests in the given guest group, the cached information, and/or other information. For example, responsive to detection of presence of the first object and the second object in preparation zone 22 and then at least one of the first object or the second object in trigger zone 30, the first interactive experience for the first guest group may be triggered in experience zone 32. The first interactive experience may include content related to the guest information in the first guest profile and the second guest profile.

In some implementations, interactive experience module 34 may be configured such that, responsive to detection of presence of two or more guest groups in preparation zone 22, and then at least one object 12 from each guest group in trigger zone 30, interactive experience module 34 may be configured to determine an interactive experience priority between the interactive experiences for each group, and to trigger the interactive experiences based on the determined priority. For example, interactive experience module 34 may be configured such that, responsive to detection of presence of the first, second, third, and fourth objects in preparation zone 22, and then at least one of the first object or the second object, and at least one of the third object or the fourth object in trigger zone 30, interactive experience module 34 may be configured to determine an interactive experience priority between the first interactive experience and the second interactive experience, and to trigger the first interactive experience and the second interactive experience based on the determined priority. In some implementations, interactive experience module 34 may be configured to determine an interactive experience priority between individual guests, between individual guests and guest groups, and/or between other groups.

In some implementations, interactive experience module 34 may determine the interactive experience priority based on one or more of a quantity of guests in a guest group, information in the guest profiles, a quantity of guest information from guest profiles associated with guests in a given guest group that has been previously presented during interactive experiences, and/or other information. In some implementations, interactive experience module 34 may determine the priority based on a priority score that is determined based on factors such as a total number of interactive experiences received, age of individual guests in the guest group, whether a guest group has a special status, and/or other attributes. In some implementations, the priority score may be determined for individual guests and/or for guest groups.

In some implementations, interactive experience module 34 may be configured such that the determined priority is based on a priority score for an individual interactive experience and/or a priority score for interactive experiences across a theme park, for example. In some implementations, previously experienced individual interactive experiences across a theme park, for example, may have different weighted values used to determine a priority. In some implementations, the priority score determined for an individual interactive experience may determine a tie breaking priority when guests with identical theme park (for example) wide scores. The priority score determined for an individual interactive experience may allow for cycling an interactive experience to present information to new guests if a theme park wide score is such that information related to a guest may never otherwise be removed from the interactive experience. A lingering guest may be gracefully coaxed from the interactive experience in this way because the guest information associated with the lingering guest is no longer presented by the interactive experience. In some implementations, interactive experience module 34 may be configured to iterate the interactive experience priority based on a current presentation of the interactive experience. The current presentation of the interactive experience may include one or more of a presentation time, a quantity of guest information presented from the guest profiles, and/or other information.

In some implementations, interactive experience module 34 may continue presenting guest information associated with a given guest even when the given guest is not actively detected in trigger zone 30 and/or experience zone 32 based on an algorithm, lack of detection in exit zone 38, and/or based on other factors. The algorithm may include, for example, an amount of time since being detected in preparation zone 22, trigger zone 30, and/or experience zone 32, and/or other factors as inputs.

Exit module 36 may be configured to determine that objects 12 have exited experience zone 32 and to cause the interactive experience triggered for the corresponding guests to cease responsive to the exit determination. For example, exit module 36 may determine that the first object has exited experience zone 32 and cause the interactive experience triggered for the first guest to cease responsive to the exit determination. In some implementations, exit module 36 may be configured to determine that objects 12 have exited experience zone 32 based on the output signals from sensors 14. For example, as shown in FIG. 1, sensors 14 may include sensors associated with exit zone 38 located downstream from experience zone 32. In some implementations, exit module 36 may be configured to determine that objects 12 have exited experience zone 32 based on an expiration of a predetermined amount of time since trigger zone detection module 28 first detected presence of the objects 12 in trigger zone 30.

One or more host systems 50 may include one or more systems configured to manage guest entry into a theme park, a restaurant, a hotel, and/or other venues; one or more databases storing guest information; one or more enterprise systems configured to manage bookings and/or reservations by guests; one or more systems configured to obtain guest information, and/or other systems. For example, host systems 50 may include a system configured to associate individual objects 12 with corresponding individual guest profiles upon guest entry into a theme park. Host systems 50 may obtain guest information via facilitation of a series of web activities, questionnaires, and games. Host systems 50 may obtain additional data about guests throughout their stay at a theme park, for example, such as where the guest is staying, what rides the guests ride and when, future plans made by guests, with whom the guest travels around the theme park, and/or other information.

FIG. 3-FIG. 8 illustrate several examples of one or more objects 12 associated with guests and/or guest groups from traveling parties progressing through an interactive experience according to one or more implementations described herein. In FIG. 3-FIG. 8 travelling party 1 includes guests A, B, C, and D. Traveling party 2 includes guests E, F, G, and H. Guests A and B form guest group 1. Guest G is guest 2. The interactive experience is presented to the guests in a queue line.

Figure 3:
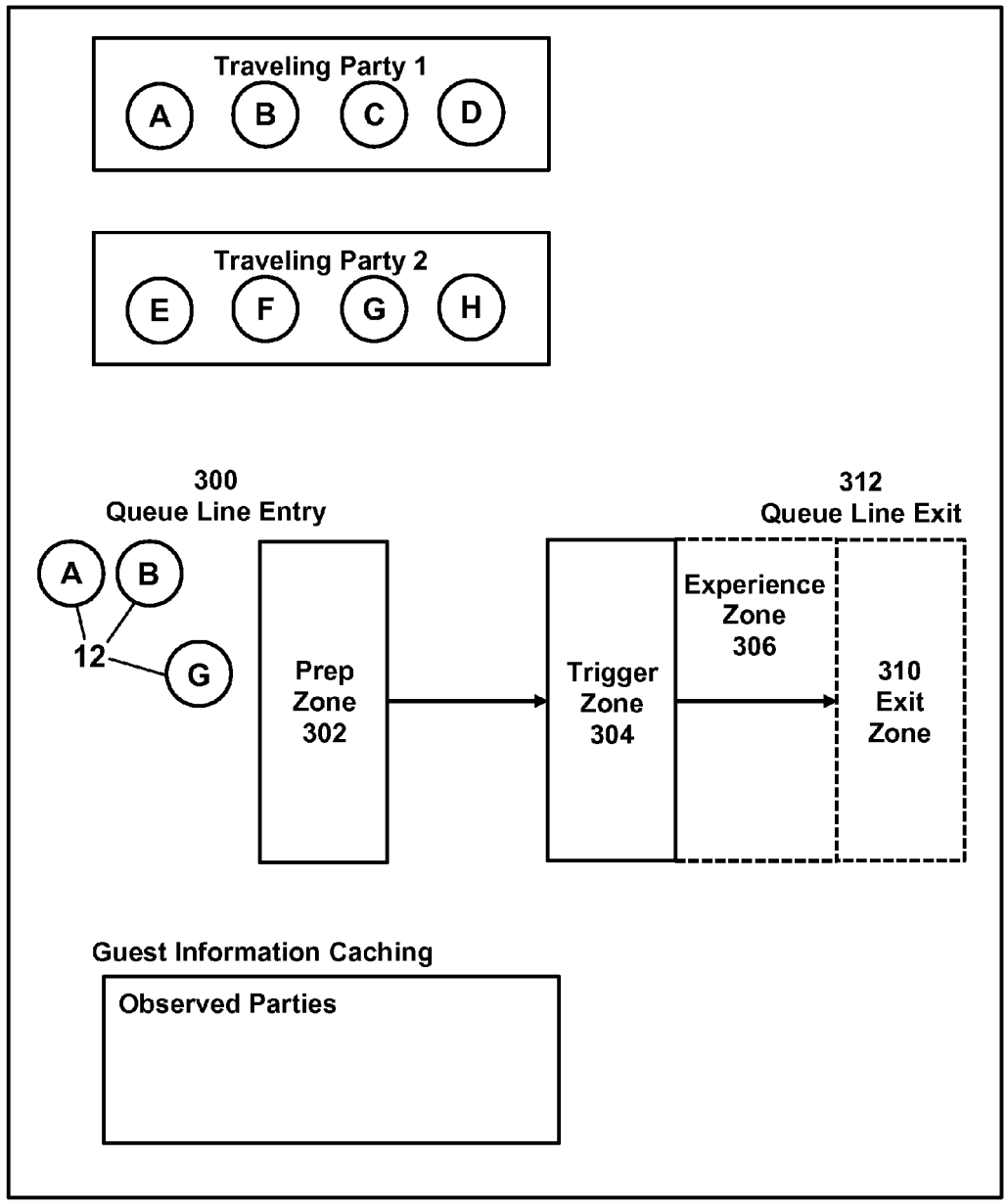
FIG. 3 illustrates an example of one or more objects associated with guests progressing through an interactive experience in a queue line.
Figure 4:
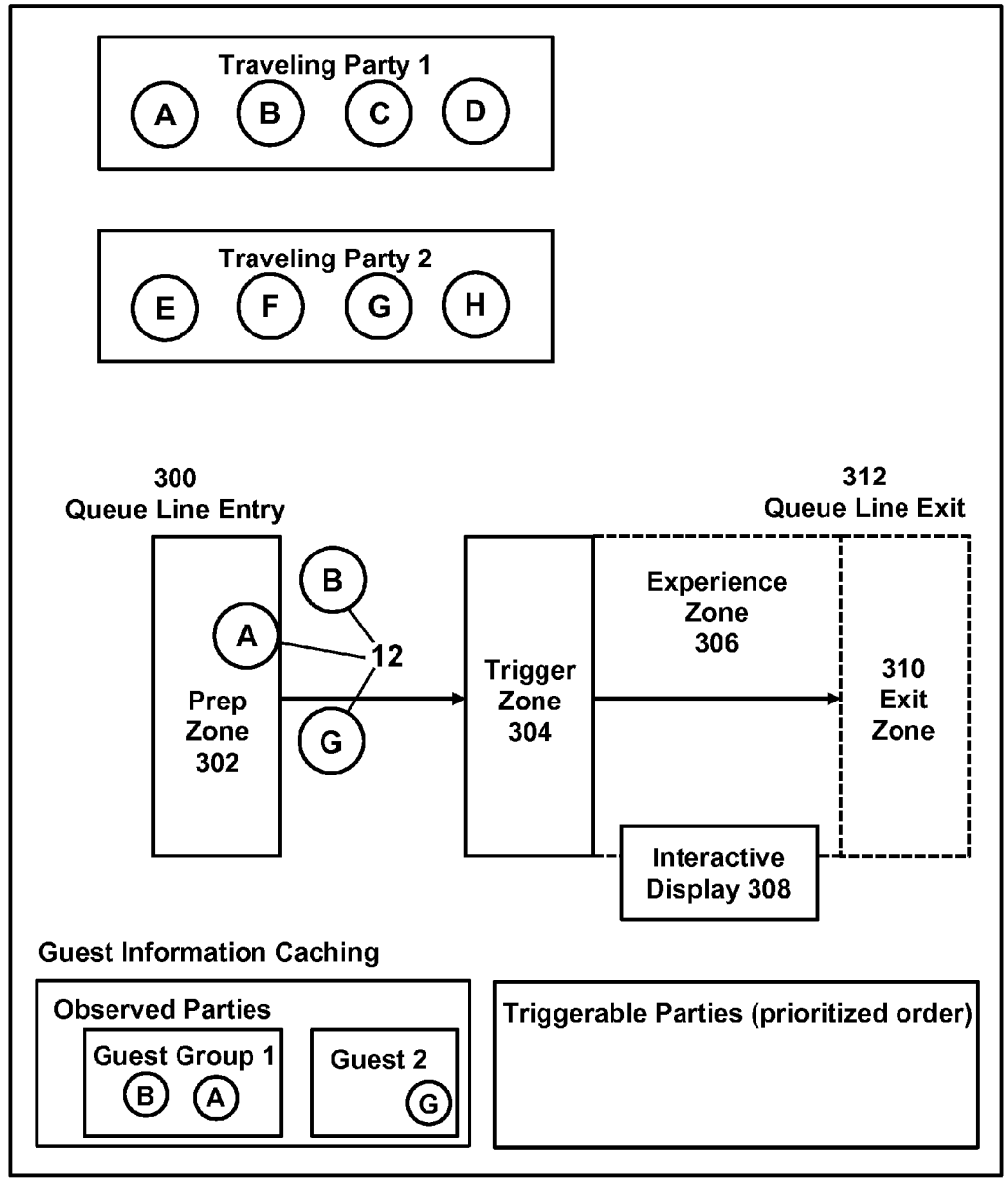
FIG. 4 illustrates a second example of one or more objects associated with guests progressing through an interactive experience in a queue line.
Figure 5:
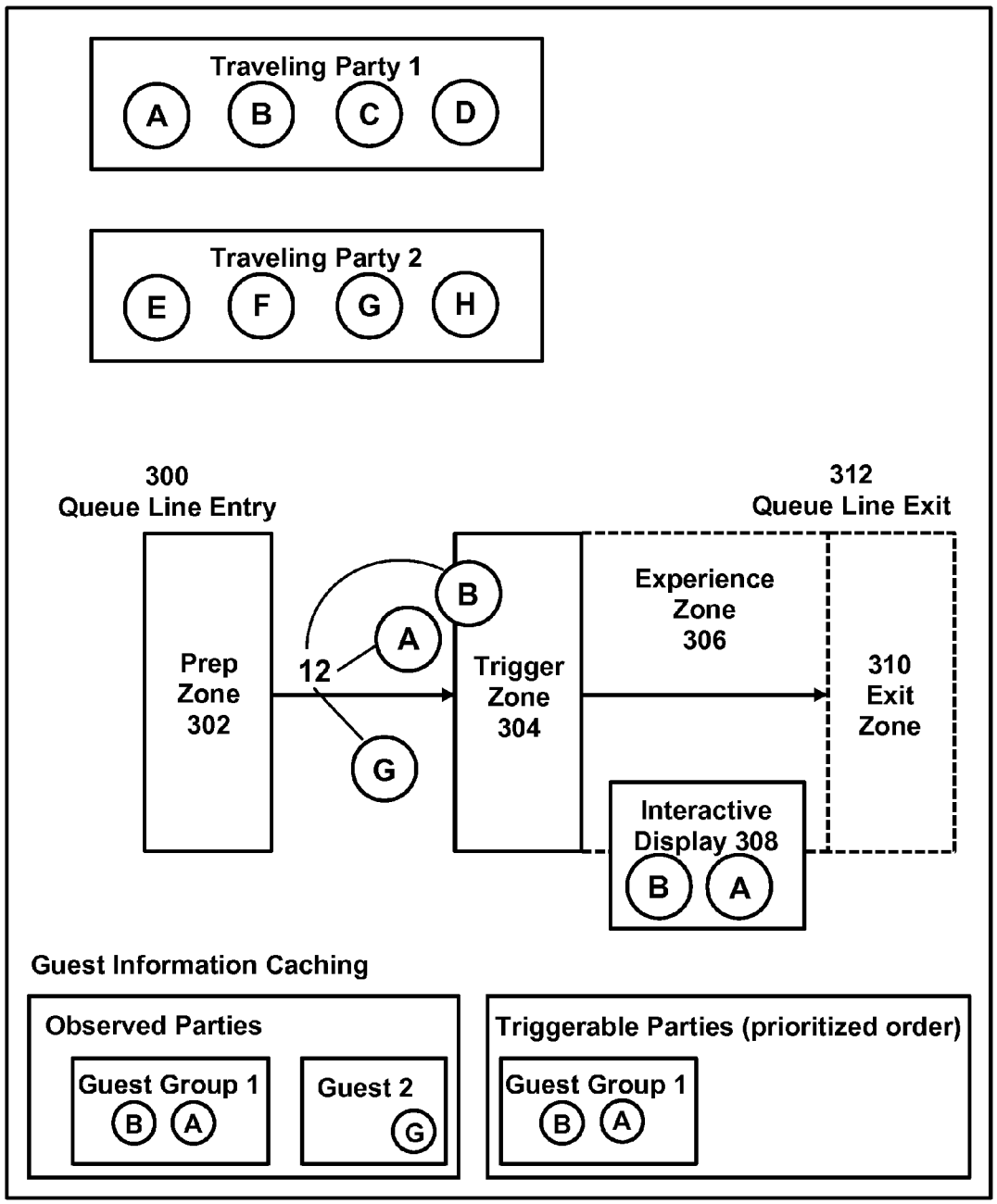
FIG. 5 illustrates a third example of one or more objects associated with guests progressing through an interactive experience in a queue line.
Figure 6:
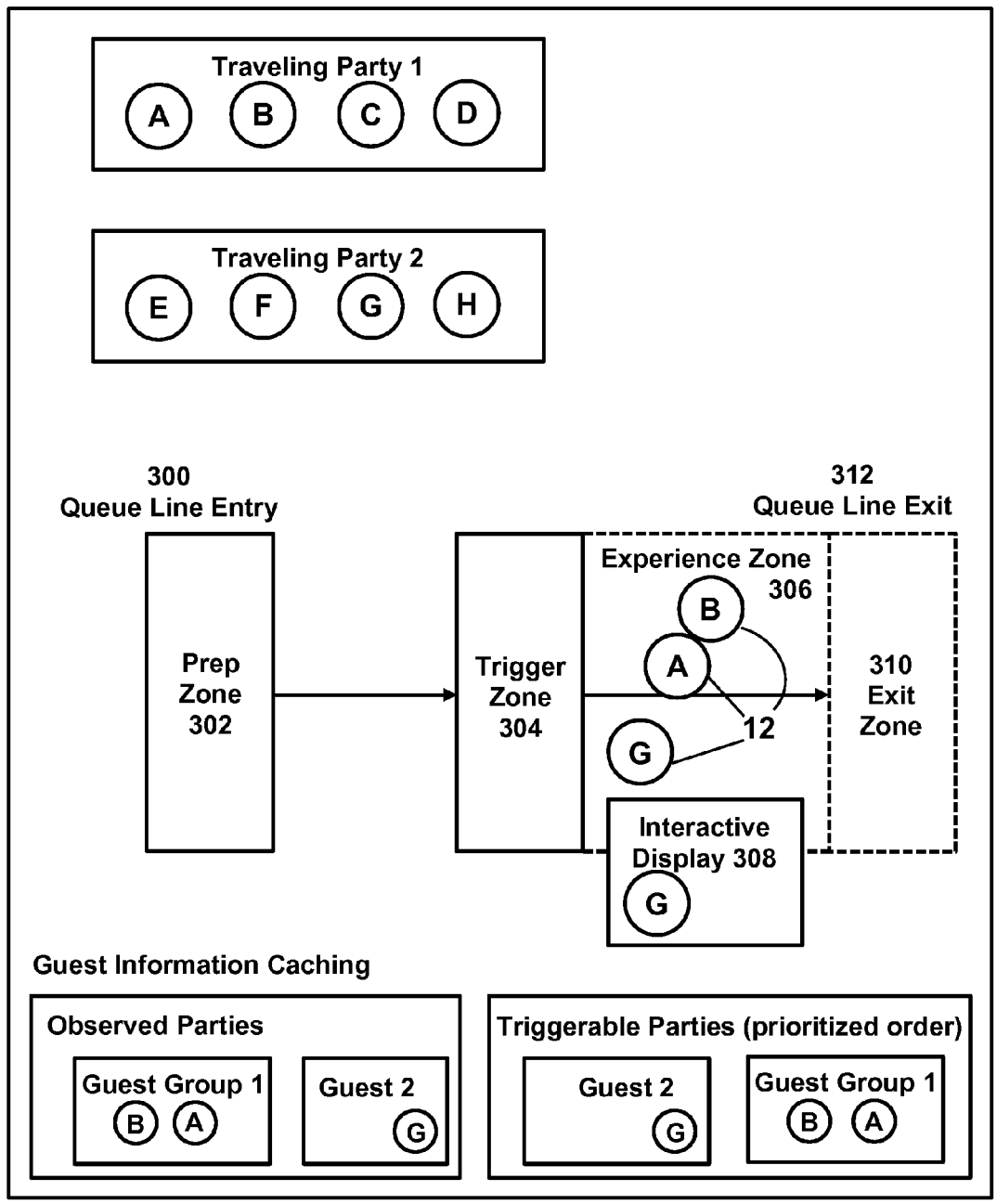
FIG. 6 illustrates a fourth example of one or more objects associated with guests progressing through an interactive experience in a queue line.
Figure 7:
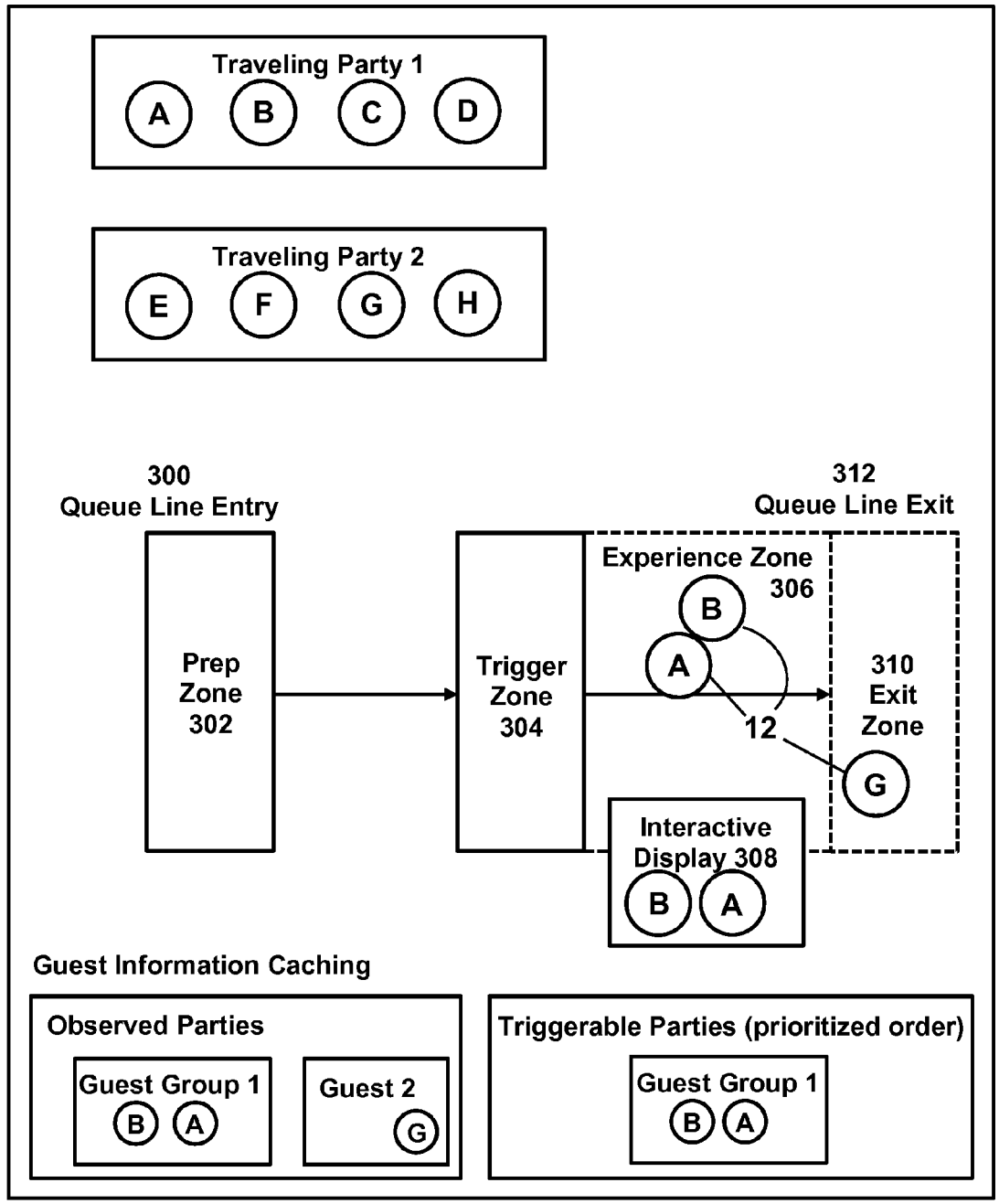
FIG. 7 illustrates a fifth example of one or more objects associated with guests progressing through an interactive experience in a queue line.
Figure 8:
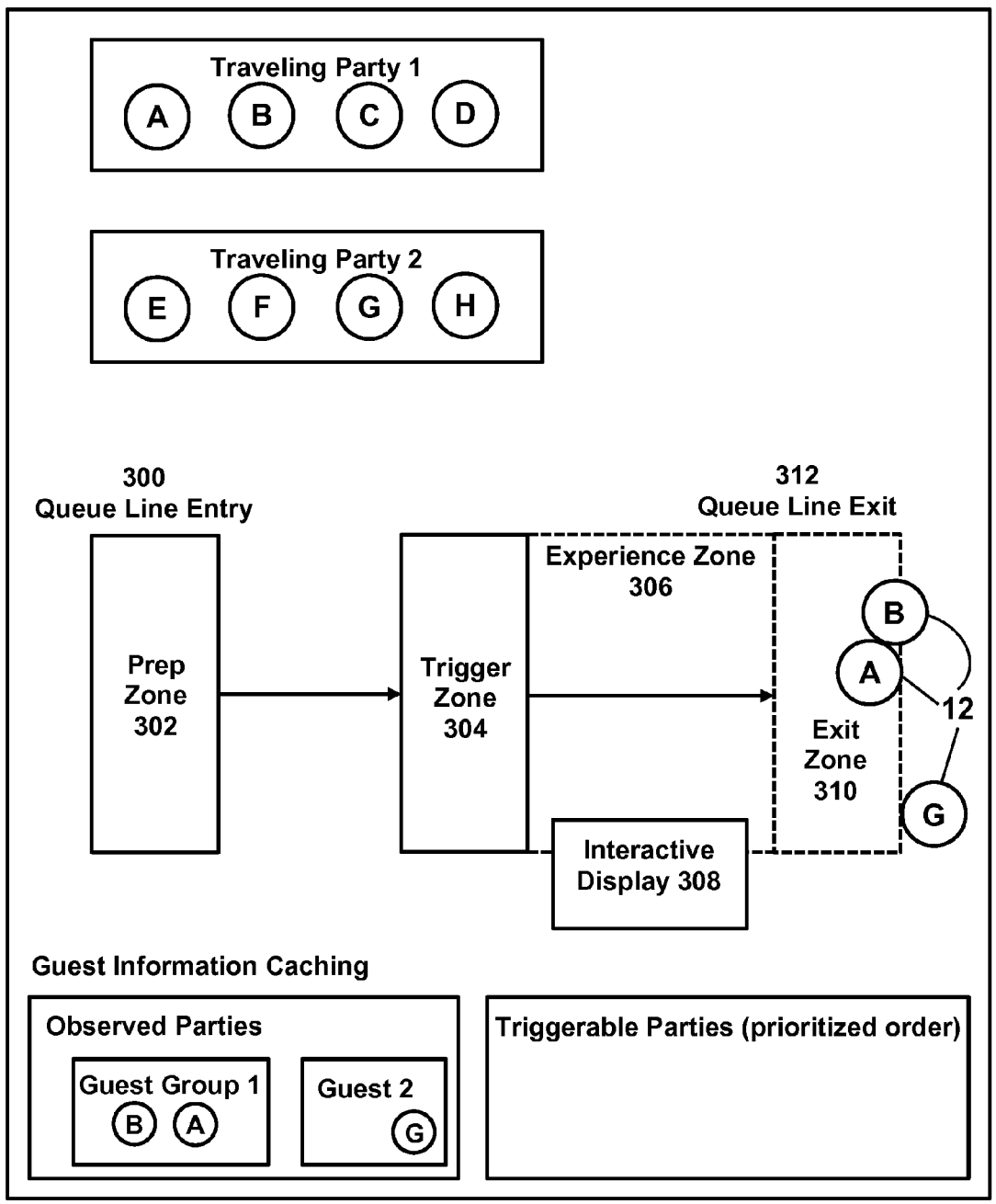
FIG. 8 illustrates a sixth example of one or more objects associated with guests progressing through an interactive experience in a queue line.

In FIG. 3, objects 12 associated with guests A, B, and G are located at a queue line entry 300 and have not yet entered a preparation zone 302. In FIG. 4, objects 12 associated with guests A, B, and G are in, or have passed through preparation zone 302. Guests A and B have been grouped into guest group 1 and the guest information associated with guests A, B, and G has been cached. In FIG. 5, only object 12 associated with guest B has been detected in a trigger zone 304. Responsive to object 12 associated with guest B being detected in trigger zone 304, an interactive experience for guests A and B of guest group 1 may be triggered in an experience zone 306. As shown in FIG. 5, the interactive experience may include displaying guest information associated with both guests A and B on an interactive display 308. In FIG. 5, an interactive experience for guest G has not been triggered because object 12 associated with guest G has not been detected in the trigger zone. In FIG. 6, objects 12 associated with guests A, B, and G have passed through trigger zone 304. The interactive experience for guest G has been prioritized above the interactive experience for guests A and B. Interactive display 308 has been caused to display guest information associated with guest G based on the prioritization. In FIG. 7, object 12 associated with guest G has been detected in an exit zone 310 after guest G passed through a queue line exit 312. The interactive experience for guests A and B has been resumed on interactive display 308. In FIG. 8 guests A, B, and G have passed through queue line exit 312 into exit zone 310. Interactive display 308 has been caused to cease displaying guest information for guests A, B, and G.

Figure 9:
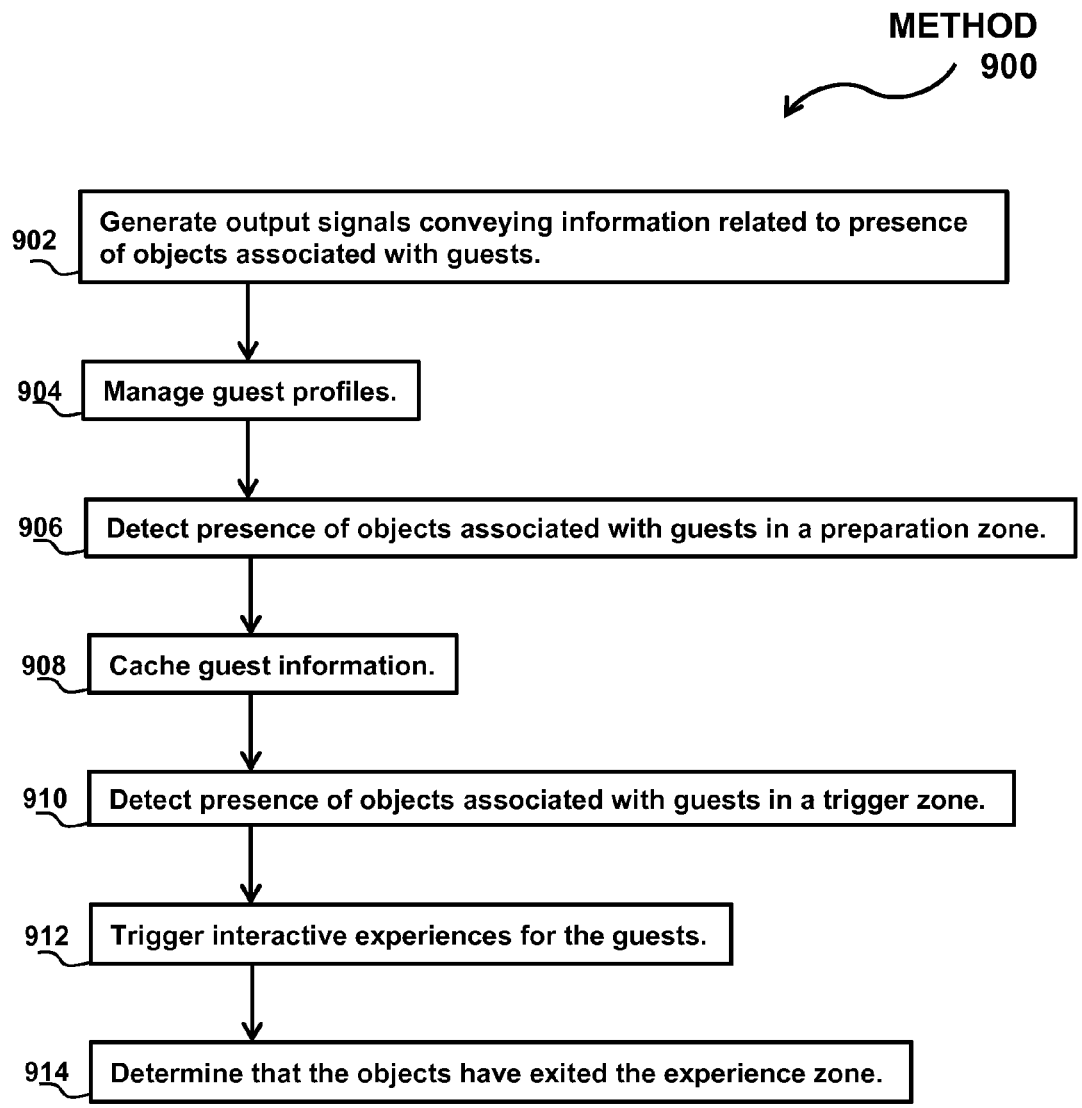
FIG. 9 illustrates a method for triggering interactive experiences for guests with a zone based identification system
Figure 10:
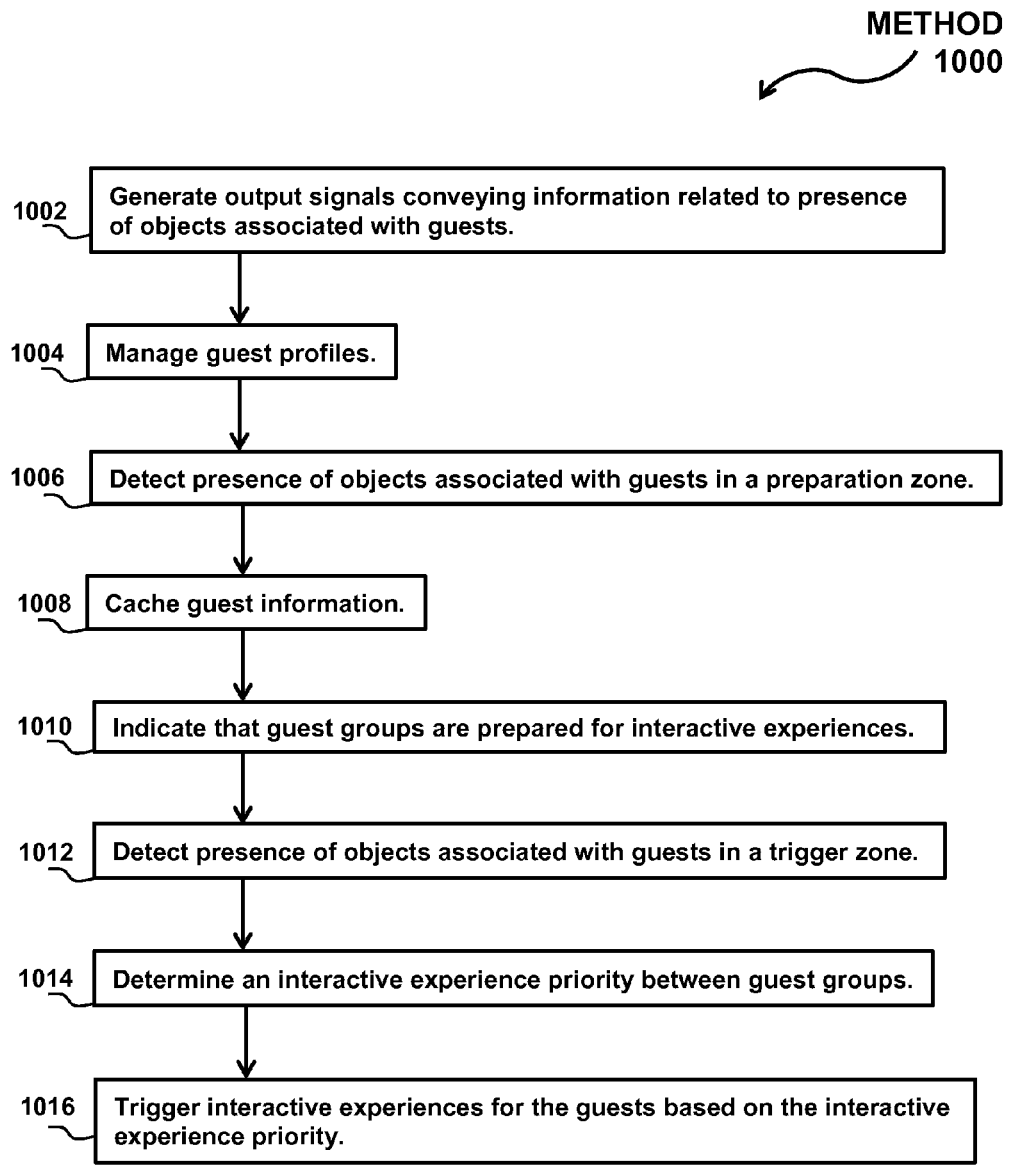
FIG. 10 illustrates a second method for triggering interactive experiences for guests with a zone based identification system.

FIG. 9 and FIG. 10 illustrate methods 900 and 1000 for triggering interactive experiences for guests with a zone based identification system in accordance with one or more implementations. The operations of methods 900 and/or 1000 presented below are intended to be illustrative. In some implementations, methods 900 and/or 1000 may be accomplished with one or more additional operations not described, and/or without one or more of the operations discussed. Additionally, the order in which the operations of methods 900 and 1000 are illustrated in FIG. 9 and FIG. 10 respectively, and described below is not intended to be limiting.

In some implementations, methods 900 and/or 1000 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 900 and/or 1000 in response to instructions stored electronically on an electronic storage medium. The one or more processing devices may include one or more devices configured through hardware, firmware, and/or software to be specifically designed for execution of one or more of the operations of methods 900 and/or 1000.

Referring to FIG. 9 and method 900, at an operation 902, output signals conveying information related to presence of objects associated with guests may be generated. The objects may include a first object associated with a first guest. Operation 902 may be performed by sensors that are the same as or similar to sensors 14 (shown in FIG. 1 and described herein).

At an operation 904, guest profiles may be managed. The guest profiles may include guest information associated with the guests such that a first guest profile includes guest information associated with the first guest. Operation 904 may be performed by a guest module that is the same as or similar to guest module 18 (shown in FIG. 1 and described herein).

At an operation 906, presence of the objects associated with the guests may be detected in a preparation zone. The presence of the first object may be detected in the preparation zone. The detections may be based on the output signals. The preparation zone may comprise a first physical area located upstream from an experience zone in which the interactive experiences are presented to the guests. Operation 906 may be performed by a preparation zone detection module that is the same as or similar to preparation zone detection module 20 (shown in FIG. 1 and described herein).

At an operation 908, guest information may be cached. The guest information may be cached responsive to the preparation zone detection. The guest information in the first guest profile may be cached responsive to detection of the first object in the preparation zone. Operation 908 may be performed by a caching module that is the same as or similar to caching module 24 (shown in FIG. 1 and described herein).

At an operation 910, presence of the objects associated with the guests may be detected in a trigger zone. Presence of the first object may be detected in the trigger zone. The detections may be based on the output signals. The trigger zone may comprise a second physical area that is downstream from the preparation zone. The trigger zone and the experience zone may be the same physical area. Operation 910 may be performed by a trigger zone detection module that is the same as or similar to trigger zone detection module 28 (shown in FIG. 1 and described herein).

At an operation 912, interactive experiences for the guests may be triggered responsive to the preparation zone and the trigger zone detections. The interactive experiences for the guests may be triggered in the experience zone. The interactive experience for the first guest may be triggered responsive to the detection of presence of the first object in the preparation zone and then the trigger zone. The interactive experience may include content related to the guest information in the first guest profile, the cached information, and/or other information. Operation 912 may be performed by an interactive experience module that is the same as or similar to interactive experience module 34 (shown in FIG. 1 and described herein).

At an operation 914, objects associated with guests may be determined to have exited the experience zone and the interactive experience may be caused to cease responsive to the exit determination. For example, the first object associated with the first guest may be determined to have exited the experience zone and the interactive experience for the first guest may be caused to cease. In some implementations, determining that the objects (e.g., the first object) have exited the experience zone may be based on the output signals. In some implementations, determining that objects (e.g., the first object) have exited the experience zone may be based on an expiration of a predetermined amount of time since the detection of presence of the objects in the trigger zone. Operation 914 may be performed by an exit module that is the same as or similar to exit module 36 (shown in FIG. 1 and described herein).

Referring to FIG. 10 and method 1000, at an operation 1002, output signals conveying information related to presence of objects associated with guests may be generated. The objects may include a first object associated with a first guest and a second object associated with a second guest. The objects may include a third object associated with a third guest and a fourth object associated with a fourth guest. Operation 1002 may be performed by sensors that are the same as or similar to sensors 14 (shown in FIG. 1 and described herein).

At an operation 1004, guest profiles may be managed. The guest profiles may include guest information associated with the guests. The guest profiles may include a first guest profile indicating that the first guest is part of a first guest group and a second guest profile indicating that the second guest is part of the first guest group. The guest profiles may include a third guest profile indicating that the third guest is part of a second guest group and a fourth guest profile indicating that the fourth guest is part of the second guest group. Operation 1004 may be performed by a guest module that is the same as or similar to guest module 18 (shown in FIG. 1 and described herein).

At an operation 1006, presence of the first, second, third, and fourth objects associated with the first, second, third, and fourth guests may be detected in a preparation zone. The detections may be based on the output signals. The preparation zone may comprise a first physical area located upstream from an experience zone in which the interactive experiences are presented to the guests. Operation 1006 may be performed by a preparation zone detection module that is the same as or similar to preparation zone detection module 20 (shown in FIG. 1 and described herein).

At an operation 1008, guest information in the first, second, third, and fourth guest profiles may be cached. The guest information may be cached responsive to the preparation zone detections. Operation 1008 may be performed by a caching module that is the same as or similar to caching module 24 (shown in FIG. 1 and described herein).

At an operation 1010, the preparedness of the first guest group for a first interactive experience may be indicated. The preparedness of the second guest group for a second interactive experience may be indicated. The indications that the first and/or second guest groups are prepared may be responsive to a threshold number of objects associated with guests of the first guest group and/or the second group being detected in the preparation zone. Operation 1010 may be performed by a group preparation module that is the same as or similar to group preparation module 26 (shown in FIG. 1 and described herein).

At an operation 1012, presence of at least one of the first object or the second object may be detected in a trigger zone. Presence of at least one of the third object or the fourth object may be detected in the trigger zone. The detections may be based on the output signals. The trigger zone may comprise a second physical area that is downstream from the preparation zone. The trigger zone and the experience zone may be the same physical area. Operation 1012 may be performed by a trigger zone detection module that is the same as or similar to trigger zone detection module 28 (shown in FIG. 1 and described herein).

At an operation 1014, interactive experiences for the guest groups may be prioritized. Responsive to detection of presence of the first, second, third, and fourth objects in the preparation zone, and then at least one of the first or second objects and at least one of the third or fourth objects in the trigger zone, an interactive experience priority may be determined between the first interactive experience and the second interactive experience. The interactive experiences may include content related to the guest information in the guest profiles for each guest group, the cached information, and/or other information. Operation 1014 may be performed by an interactive experience module that is the same as or similar to interactive experience module 34 (shown in FIG. 1 and described herein).

At an operation 1016, the first interactive experience and the second interactive experience may be triggered based on the determined priority. In some implementations, the interactive experience module may iterate the interactive experience priority based on a current presentation of the interactive experience. The current presentation of the interactive experience may including one or more of a presentation time, a quantity of guest information presented from the guest profiles, and/or other parameters. In some implementations, the interactive experience priority may be determined based on one or more of a quantity of guests in the first guest group, a quantity of guests in the second guest group, a quantity of guest information from guest profiles associated with guests in the first guest group that has been previously presented during the interactive experience, a quantity of guest information from guest profiles associated with guests in the second guest group that has been previously presented during the interactive experience, and/or other information. Operation 1016 may be performed by an interactive experience module that is the same as or similar to interactive experience module 34 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A zone based identification system configured to trigger interactive experiences for guests, the system comprising:
   one or more sensors configured to generate output signals conveying information related to presence of objects associated with the guests, the objects including a first object associated with a first guest;
   one or more processors configured by machine-readable instructions:
      manage guest profiles associated with guests, the guest profiles including guest information associated with the guests such that a first guest profile includes guest information associated with the first guest;
      detect presence of the first object in a preparation zone based on the output signals, the preparation zone comprising a first physical area located upstream from an experience zone in which the interactive experiences are presented to the guests;

detect presence of the first object in a trigger zone based on the output signals, the trigger zone comprising a second physical area that is downstream from the preparation zone; and trigger interactive experiences for the guests in the experience zone such that a requirement for triggering an interactive experience for the first guest in the experience zone includes detection of presence of the first object in the preparation zone followed by detection of presence of the first object in the trigger zone, the interactive experience including content related to the guest information in the first guest profile; and wherein a guest flow pattern between the preparation zone and the experience zone is known such that the triggering of interactive experiences in the experience zone is adapted to the guest flow pattern.

2. The system of claim 1, wherein the one or more processors are further configured by machine-readable instructions to:

cache the guest information in the first guest profile responsive to the detected presence in the preparation zone; and wherein the interactive experience includes content related to the cached information.

3. The system of claim 1, wherein the one or more processors are further configured by machine-readable instructions to:

determine that the first object has exited the experience zone; and cause the interactive experience triggered for the first guest to cease responsive to the exit determination.

4. The system of claim 3, wherein determining that the first object has exited the experience zone is based on the output signals from the one or more sensors.

5. The system of claim 3, wherein determining that the first object has exited the experience zone is based on an expiration of a predetermined amount of time since the detected presence of the first object in the trigger zone.

6. The system of claim 1, wherein the trigger zone and the experience zone are the same physical area.

7. A method for triggering interactive experiences for guests with a zone based identification system, the method comprising:

generating output signals conveying information related to presence of objects associated with the guests, the objects including a first object associated with a first guest;

managing guest profiles associated with guests, the guest profiles including guest information associated with the guests such that a first guest profile includes guest information associated with the first guest;

detecting presence of the first object in a preparation zone based on the output signals, the preparation zone comprising a first physical area located upstream from an experience zone in which the interactive experiences are presented to the guests;

detecting presence of the first object in a trigger zone based on the output signals, the trigger zone comprising a second physical area that is downstream from the preparation zone;

triggering interactive experiences for the guests in the experience zone such that a requirement for triggering an interactive experience for the first guest in the experience zone includes detection of presence of the first object in the preparation zone followed by detection of presence of the first object in the trigger zone, the interactive experience including content related to the guest information in the first guest profile; and wherein a guest flow pattern between the preparation zone and the experience zone is known such that the triggering of interactive experiences in the experience zone is adapted to the guest flow pattern.

8. The method of claim 7, further comprising caching the guest information in the first guest profile responsive to the preparation zone detection, and wherein the interactive experience includes content related to the cached information.

9. The method of claim 7, further comprising determining that the first object has exited the experience zone and causing the interactive experience triggered for the first guest to cease responsive to the exit determination.

10. The method of claim 9, further comprising determining that the first object has exited the experience zone based on the output signals.

11. The method of claim 9, further comprising determining that the first object has exited the experience zone based on an expiration of a predetermined amount of time since the detection of presence of the first object in the trigger zone.

12. The method of claim 9, wherein the trigger zone and the experience zone are the same physical area.

13. A zone based identification system configured to trigger interactive experiences for guests, the system comprising:

one or more sensors configured to generate output signals conveying information related to presence of objects associated with the guests, the objects including a first object associated with a first guest and a second object associated with a second guest;

one or more processors configured by machine-readable instructions to:

manage guest profiles associated with the guests, the guest profiles including guest information associated with the guests, the guest profiles including a first guest profile indicating that the first guest is part of a first guest group and a second guest profile indicating that the second guest is part of the first guest group;

detect presence of the first object and the second object in a preparation zone based on the output signals, the preparation zone comprising a first physical area located upstream from an experience zone in which the interactive experiences are presented to the guests;

indicate that the first guest group is prepared for a first interactive experience, the indication that the first guest group is prepared being responsive to a threshold number of objects associated with guests of the first guest group being detected in the preparation zone;

detect presence of at least one of the first object or the second object in a trigger zone based on the output signals, the trigger zone comprising a second physical area that is downstream from the preparation zone; and trigger the interactive experiences for the guests in the experience zone such that a requirement for triggering a first interactive experience for the first guest group in the experience zone includes detection of presence of the first object and the second object in the preparation zone followed by detection of presence of at least one of the first object or the second object in the trigger zone, the first interactive experience including content related to the guest information in the first guest profile and the second guest profile; and wherein a guest flow pattern between the preparation zone and the experience zone is known such that the triggering of interactive experiences in the experience zone is adapted to the guest flow pattern.

14. The system of claim 13, wherein:
the objects include a third object associated with a third guest and a fourth object associated with a fourth guest;
the guest profiles include a third guest profile indicating that the third guest is part of a second guest group and a fourth guest profile indicating that the fourth guest is part of the second guest group; and
the one or more processors are further configured by machine-readable instructions to:
  detect presence of the third object and the fourth object in the preparation zone;
  indicate that the second guest group is prepared for a second interactive experience; and
  detect presence of at least one of the third object or the fourth object in the trigger zone; and
  responsive to detection of presence of the third object and the fourth object in the preparation zone, and then at least one of the third object or the fourth object in the trigger zone, determine an interactive experience priority between the first interactive experience and the second interactive experience, and trigger the first interactive experience and the second interactive experience based on the determined priority.

15. The system of claim 14, wherein the one or more processors are further configured by machine-readable instructions to iterate the interactive experience priority based on a current presentation of the interactive experience, the current presentation of the interactive experience including one or more of a presentation time, or a quantity of guest information presented from the guest profiles.

16. The system of claim 14, wherein determining the interactive experience priority is based on one or more of a quantity of guests in the first guest group, a quantity of guests in the second guest group, a quantity of guest information from guest profiles associated with guests in the first guest group that has been previously presented during the interactive experience, or a quantity of guest information from guest profiles associated with guests in the second guest group that has been previously presented during the interactive experience.

17. The system of claim 13, wherein the one or more processors are further configured by machine-readable instructions to cache the guest information in the first guest profile and the second guest profile responsive to the determined presence in the preparation zone, and wherein the first interactive experience includes content related to the cached information.

18. The system of claim 13, wherein the trigger zone and the experience zone are the same physical area.

19. A method for triggering interactive experiences for guests with a zone based identification system, the method comprising:
  generating output signals conveying information related to presence of objects associated with the guests, the objects including a first object associated with a first guest and a second object associated with a second guest;
  managing guest profiles associated with the guests, the guest profiles including guest information associated with the guests, the guest profiles including a first guest profile indicating that the first guest is part of a first guest group and a second guest profile indicating that the second guest is part of the first guest group;
  detecting presence of the first object and the second object in a preparation zone based on the output signals, the preparation zone comprising a first physical area located upstream from an experience zone in which the interactive experiences are presented to the guests;
  indicating that the first guest group is prepared for a first interactive experience, the indication that the first guest group is prepared being responsive to a threshold number of objects associated with guests of the first guest group being detected in the preparation zone;
  detecting presence of at least one of the first object or the second object in a trigger zone based on the output signals, the trigger zone comprising a second physical area that is downstream from the preparation zone;
  triggering the interactive experiences for the guests in the experience zone such that a requirement for triggering a first interactive experience for the first guest group in the experience zone includes detection of presence of the first object and the second object in the preparation zone followed by detection of presence of at least one of the first object or the second object in the trigger zone, the first interactive experience including content related to the guest information in the first guest profile and the second guest profile; and
  wherein a guest flow pattern between the preparation zone and the experience zone is known such that the triggering of interactive experiences in the experience zone is adapted to the guest flow pattern.

20. The method of claim 19, wherein the objects include a third object associated with a third guest and a fourth object associated with a fourth guest, and wherein the guest profiles include a third guest profile indicating that the third guest is part of a second guest group and a fourth guest profile indicating that the fourth guest is part of the second guest group, the method further comprising:
  detecting presence of the third object and the fourth object in the preparation zone,
  indicating that the second guest group is prepared for a second interactive experience,
  detecting presence of at least one of the third object or the fourth object in the trigger zone; and
  responsive to detection of presence of the third object and the fourth object in the preparation zone, and then at least one of the third object or the fourth object in the trigger zone, determining an interactive experience priority between the first interactive experience and the second interactive experience, and to trigger the first interactive experience and the second interactive experience based on the determined priority.

21. The method of claim 20, further comprising iterating the interactive experience priority based on a current presentation of the interactive experience, the current presentation of the interactive experience including one or more of a presentation time, or a quantity of guest information presented from the guest profiles.

22. The method of claim 20, further comprising determining the interactive experience priority based on one or more of a quantity of guests in the first guest group, a quantity of guests in the second guest group, a quantity of guest information from guest profiles associated with guests in the first guest group that has been previously presented during the interactive experience, or a quantity of guest information from guest profiles associated with guests in the second guest group that has been previously presented during the interactive experience.

23. The method of claim 19, further comprising caching the guest information in the first guest profile and the second guest profile responsive to the preparation zone detection, and wherein the first interactive experience includes content related to the cached information.

24. The method of claim 19, wherein the trigger zone and the experience zone are the same physical area.

\* \* \* \* \*